(12) United States Patent
Watanabe et al.

(10) Patent No.: US 8,123,978 B2
(45) Date of Patent: Feb. 28, 2012

(54) LIQUID CRYSTALLINE POLYESTER RESIN COMPOSITION

(75) Inventors: Kazufumi Watanabe, Shizuoka (JP);
Hirokazu Ohshiba, Shizuoka (JP);
Raita Nishikawa, Shizuoka (JP);
Kenichi Yasusaka, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 74 days.

(21) Appl. No.: 12/741,060

(22) PCT Filed: Oct. 28, 2008

(86) PCT No.: PCT/JP2008/003051
§ 371 (c)(1),
(2), (4) Date: May 3, 2010

(87) PCT Pub. No.: WO2009/057272
PCT Pub. Date: May 7, 2009

(65) Prior Publication Data
US 2010/0237284 A1    Sep. 23, 2010

(30) Foreign Application Priority Data

Nov. 1, 2007 (JP) ................. 2007-285292

(51) Int. Cl.
*C09K 19/38* (2006.01)
*C09K 19/54* (2006.01)
*C08L 67/08* (2006.01)

(52) U.S. Cl. ............. 252/299.01; 252/299.5; 525/444.5
(58) Field of Classification Search ............ 252/299.01, 252/299.5; 525/444.5
See application file for complete search history.

(56) References Cited

U.S. PATENT DOCUMENTS

| 5,409,979 A | 4/1995 | Nakai |
| 2004/0152806 A1 | 8/2004 | Koga et al. |

FOREIGN PATENT DOCUMENTS

| EP | 0 352 458 A2 | 1/1990 |
| JP | 2-208353 A | 8/1990 |
| JP | 4-249528 A | 9/1992 |
| JP | 2915915 B2 | 7/1999 |
| JP | 2003-171450 A | 6/2003 |

OTHER PUBLICATIONS

Communication from European Patent Office including Supplementary European Search Report, dated Dec. 2, 2010.
International Search Report for PCT/JP2008/003051 completed Nov. 21, 2008.

*Primary Examiner* — Shean Wu
(74) *Attorney, Agent, or Firm* — Buchanan Ingersoll & Rooney PC

(57) ABSTRACT

The present invention provides a liquid crystalline polyester resin composition which imparts a good mold-releasability during molding and further is improved in heat resistance. Specifically, with 100 parts by weight of a liquid crystalline polyester resin is added 0.001 to 1 part by weight of a fatty acid ester which is a tetraester of pentaerythritol and a C10 to C32 higher fatty acid and has an acid value ranging from 0.01 to 0.5 and a hydroxyl value ranging from 0.01 to 5.

8 Claims, 1 Drawing Sheet

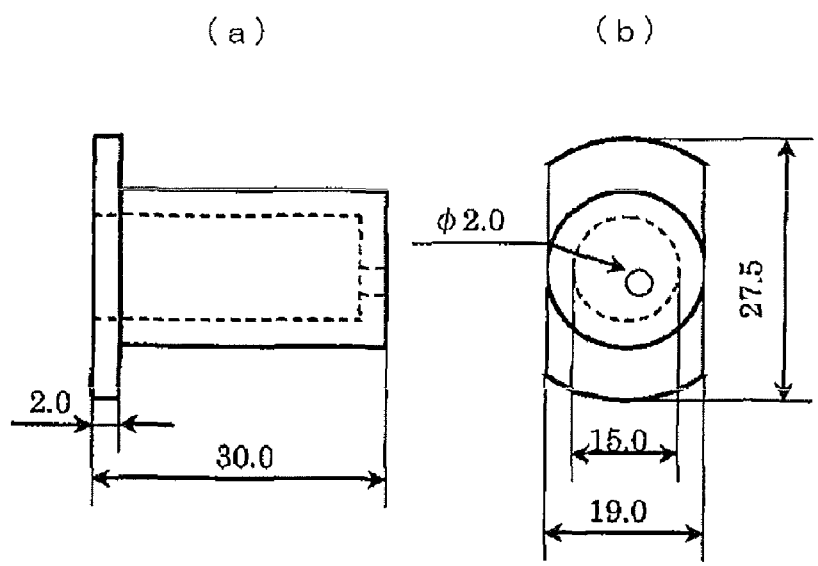

LIQUID CRYSTALLINE POLYESTER RESIN COMPOSITION

TECHNICAL FIELD

The present invention relates to a liquid crystalline polyester composition which has good mold-releasability during molding and which has further improved heat resistance.

BACKGROUND ART

In recent years, materials for electrical and electronic equipment parts, materials for automobile equipment parts, materials for chemical equipment parts, and the like have been requested to be thermoplastic resins having high heat resistance. Although liquid crystalline polyester resins belong to the resins which meet the requirement, these resins are used in a large quantity for precision-molded articles because of good flowability and small shrinkage during solidifying from the molten state thereof. However, due to the fact that there are a large number of complex-shape molds for the molded articles, there arises a problem of deteriorated productivity, because of poor releasability of these liquid crystalline polyester resins from molds during the molding operation, difficulty in the stable continuous molding operations of the resins, and slow molding speed (molding cycle). With the above situation, mold-releasability of the liquid crystalline polyester resins is still insufficient, though it is better than that of other resins.

As a common practice for improving the mold-releasability, there is a method to add a mold-release improving agent to resin. There are known mold-release improving agents such as:
(1) a method for adding a metal salt of a fatty acid such as zinc stearate or lithium stearate; (2) a method for adding an ester of fatty acid such as glycerol tristearate; and (3) a method for adding an amide of fatty acid such as N,N'-alkylenebisalkane amide. However, even though the releasing effect is observed in any of these (1), (2) and (3) methods, the thermal decomposition temperature of the mold-releasing agent is lower than the molding-processing temperature of the liquid crystalline polyester resin. There are problems such as a discolored molded article, deteriorated mechanical properties and gas generation at the time of kneading-processing and molding, caused by the decomposition of the mold-releasing agent.

To solve such problems, Japanese Patent No. 2915915 proposed adding a specific higher fatty acid ester.

DISCLOSURE OF THE INVENTION

According to the above Japanese Patent No. 2915915, there arises no problem of gas generation and the like, and the mold-releasability is improved. In recent years, however, the use environments of the liquid crystalline polyester resins have become more severe than ever, and higher heat resistance has been required. In order to meet the requirements, the liquid crystalline polyester resins having higher melting point than ever have come into use. With the use of that type of liquid crystalline polyester resins, the processing temperature has become high, and the heat resistance thereof at higher temperature has been requested. In this regard, the mold-releasing agent of Japanese Patent No. 2915915 has no longer come to be able to adequately satisfy the requirements.

The inventors of the present invention have conducted studies to maintain good mold-releasability and to improve the heat resistance at high temperatures of the liquid crystalline polyester resin composition, and have found that the use of a specific high-purity fatty acid tetraester is extremely effective, thus having perfected the present invention.

That is, the present invention provides a liquid crystalline polyester resin composition, comprising 100 parts by weight of a liquid crystalline polyester resin; and 0.001 to 1 part by weight of a fatty acid ester which is a tetraester of pentaerythritol and a C10 to C32 higher fatty acid and has an acid value ranging from 0.01 to 0.5 and a hydroxyl value ranging from 0.01 to 5.

The liquid crystalline polyester resin, (hereinafter the term "resin" is not referred to), according to the present invention signifies a melt-processable polymer having a properties of being capable of forming an optically anisotropic molten phase. The properties of the anisotropic molten phase can be confirmed by a common polarization inspection method utilizing orthogonal polarizers. Specifically the confirmation of the anisotropic molten phase can be done by observing a molten sample on a Leitz hot stage in a Leitz polarization microscope at a magnification of 40 under a nitrogen atmosphere. The liquid crystalline resin applicable to the present invention allows the polarized light normally to penetrate therethrough even in the molten and in a stationary state, under the inspection between the orthogonal polarizers, thus showing optical anisotropy.

Although the above liquid crystalline polyester is not specifically limited, preferred ones are aromatic polyester and aromatic polyester amide. Polyester partially containing aromatic polyester or aromatic polyester amide within the same molecular chain is also the applicable one. Applicable liquid crystalline polyesters preferably have a inherent viscosity (IV) of at least about 2.0 dl/g, and more preferably 2.0 to 10.0 dl/g, measured by dissolving 0.1% by weight of the liquid crystalline polyester in pentafluorophenol at 60° C.

Specifically preferred aromatic polyester or aromatic polyester amide as the liquid crystalline polyester applicable to the present invention includes an aromatic polyester and an aromatic polyester amide, containing at least one compound selected from an aromatic hydroxycarboxylic acid, an aromatic hydroxyamine, and an aromatic diamine as the structural component.

More specifically, there are applicable:
(1) a polyester composed mainly of one, two or more of an aromatic hydroxycarboxylic acid and a derivative thereof;
(2) a polyester composed mainly of (a) one, two or more of an aromatic hydroxycarboxylic acid and a derivative thereof, (b) one, two or more of an aromatic dicarboxylic acid, an alicyclic dicarboxylic acid, and a derivative thereof, and (c) at least one, two or more of an aromatic diol, an alicyclic diol, an aliphatic diol, and a derivative thereof;
(3) a polyester amide composed mainly of (a) one, two or more of an aromatic hydroxycarboxylic acid and a derivative thereof, (b) one, two or more of an aromatic hydroxyamine, an aromatic diamine, and a derivative thereof, and (c) one, two or more of an aromatic dicarboxylic acid, alicyclic dicarboxylic acid, and a derivative thereof; and
(4) a polyester amide composed mainly of (a) one, two or more of an aromatic hydroxycarboxylic acid and a derivative thereof, (b) one, two or more of an aromatic hydroxyamine, an aromatic diamine, and a derivative thereof, (c) one, two or more of an aromatic dicarboxylic acid, alicyclic dicarboxylic acid, and a derivative thereof, and (d) at least one, two or more of an aromatic diol, an alicyclic diol, an aliphatic diol, and a derivative thereof. Furthermore, there may be added a molecular-weight adjuster, if required, to the above structural components.

Preferred examples of the specific compound structuring the liquid crystalline polyester applicable to the present invention are: aromatic hydroxycarboxylic acids such as p-hydroxybenzoic acid or 6-hydroxy-2-naphthoic acid; aromatic diols such as 2,6-dihydroxynaphthalene, 1,4-dihydroxynaphthalene, 4,4'-dihydroxybiphenyl, hydroquinone, resorcin, or compounds represented by the following formulae (I) and (II); aromatic dicarboxylic acids such as terephthalic acid, isophthalic acid, 4,4'-diphenylcarboxylic acid, 2,6-naphthalene dicarboxylic acid, or a compound represented by the following formula (III); and aromatic amines such as p-aminophenol or p-phenylene diamine.

[Chemical Formula 1]

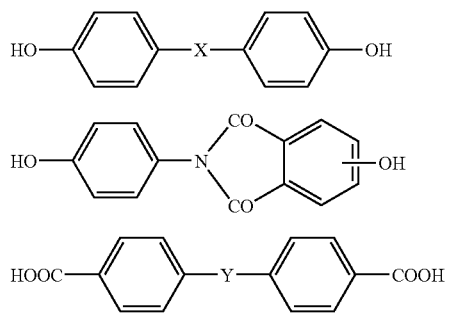

where: X is a group selected from an alkylene (C1 to C4), an alkylidene, —O—, —SO—, $SO_2$—, —S—, and —CO—; and Y is a group selected from —$(CH_2)_n$— (n=1 to 4) and —$O(CH_2)_nO$— (n=1 to 4).

Specifically, preferred liquid crystalline polyesters applied to the present invention include aromatic polyesters containing p-hydroxybenzoic acid, 6-hydroxy-2-naphthoic acid, 4,4'-dihydroxybiphenyl, and terephthalic acid as the main structural unit components.

Among the liquid crystalline polyester resins, the ones which are called the "I type" of relatively high melting point (330° C. to 380° C.) produce significant intended effects.

The fatty acid ester applied to the present invention is a tetraester of pentaerythritol and C10 to C32 higher fatty acid, having an acid value ranging from 0.01 to 0.5 and a hydroxyl value ranging from 0.01 to 5, and preferably a C14 to C26 higher fatty acid, where pentaerythritol tetrastearate and pentaerythritol tetrabehenate are specifically preferred.

The acid value in the present invention can be measured by a known method, and for example, a common method is to dissolve a sample in a mixed solvent of benzene and ethanol, and the like, and then to titrate the sample with a potassium hydroxide solution of accurately known titer. The acid value according to the present invention is within the range of 0.01 to 0.5, and preferably 0.3 or smaller. If the acid value is larger than 0.5, thermal deterioration of the resin is advanced when added in the liquid crystalline polyester resin, which is not preferable.

The hydroxyl value in the present invention can be measured by a known method, and for example, the method is to heat a sample together with an excessive volume of acetylating agent, such as acetic anhydride, to conduct acetylation, and to measure the saponification value of thus yielded acetylated product, and then to calculate the hydroxyl value by the following formula.

Hydroxyl value=$A/(1-0.00075A)-B$ where, A is the saponification value after acetylation, and B is the saponification value before acetylation.

The hydroxyl value according to the present invention is within the range of 0.01 to 5, preferably 4 or smaller, and further preferably 3 or smaller.

If the hydroxyl value is larger than 5, the thermal deterioration of the resin is advanced when added in the liquid crystalline polyester resin, which is not preferable.

The liquid crystalline polyester resin according to the present invention can contain varieties of fibrous, powder-particle, and plate-like inorganic fillers depending on the uses.

Examples of the fibrous fillers are inorganic fibrous materials such as glass fiber, asbestos fiber, silica fiber, silica-alumina fiber, alumina fiber, zirconia fiber, boron nitride fiber, silicon nitride fiber, boron fiber, potassium titanate fiber, and metal fabulous materials such as that of stainless steel, aluminum, titanium, copper, and brass.

Examples of the particulate fillers include: carbon black; graphite; silica; quartz powder; glass bead; milled glass fiber; glass balloon; glass powder; silicates such as calcium silicate, aluminum silicate, kaolin, talc, clay, diatom earth, or wollastonite; metal oxides such as iron oxide, titanium oxide, zinc oxide, antimony trioxide, or alumina; metal carbonates such as calcium carbonate or magnesium carbonate; metal sulfates such as calcium sulfate or barium sulfate; ferrite; silicon carbide; silicon nitride; boron nitride; and various metal powders.

Examples of the plate-like filler are mica, glass flake, and foil of various metals.

These inorganic fillers can be used either alone or in combination of two or more of them.

When using these fillers, it is preferred to use, if required, a sizing agent or a surface-treating agent. Examples of them are functional compounds such as an epoxy-based compound, an isocyanate-based compound, a silane-based compound, and a titanate-based compound. These compounds may be preliminarily subjected to surface treatment or to sizing agent-treatment, or may be added simultaneously at the time of material preparation.

The additive amount of the inorganic filler is 500 parts by weight or smaller to 100 parts by weight of the liquid crystalline polyester resin, preferably 0.5 to 500 parts by weight, and more preferably 5 to 250 parts by weight. If the additive amount thereof is larger than 500 parts by weight, the flowability is lost, and the molding work specifically for a complex shape mold becomes difficult. Specifically when excess amount of the inorganic filler is added, the resin becomes brittle, which raises a problem of mechanical strength of the molded article.

Furthermore, the composition according to the present invention can arbitrarily contain known substances which are normally added to thermoplastic resins and thermosetting resins, at an adequate amount depending on the required performance.

The substances may include stabilizers such as antioxidant and UV absorber, anti-static agent, flame retardant, colorant such as dye or pigment.

The liquid crystalline polyester resin composition according to the present invention can be prepared by an apparatus and a method ordinarily applied to prepare synthetic resin compositions. That is, necessary components can be mixed together, which are then kneaded and extruded in a single-screw or twin-screw extruder to form the pellets for molding. Alternatively, there are a method for mixing some of the necessary components as the master batch and molding them, and another method for pulverizing a part or total of the liquid crystalline polyester resin in order to attain better dispersion and mixing of the respective components, then blending them for melting and extrusion. Any of these methods can be applicable.

BRIEF DESCRIPTION OF THE DRAWING

FIG. 1 shows a hat-shaped molded article, used for evaluating the mold-release resistance according to the present invention, and (a) and (b) are a side view and a top view, respectively.

EXAMPLES

The present invention is described in more detail in reference to the following examples. The present invention, however, is not limited to these examples.

Examples 1 and 2

To a liquid crystalline polyester (Vectra S950, manufactured by Polyplastics Co., Ltd.), there were mixed a glass fiber (glass chopped strand ECS 03-T-786H, manufactured by Nippon Electric Glass Co., Ltd.), a talc (Crown talc PP, manufactured by Matsumura Sangyo Co., Ltd.), and any of B-1 (Pentaerythritol tetrabehenate, Nissan Electrol WEP-5, manufactured by NOF Corporation) and B-2 (Pentaerythritol tetrastearate, Nissan Electrol WEP-6, manufactured by NOF Corporation) as the fatty acid ester, at the respective quantities given in Table 1. The mixture was melt-kneaded in a twin-screw extruder (44 mm, TEX-44, manufactured by The Japan Steel Works Ltd.) at the cylinder temperature of 365° C., and thus pellets were obtained. The pellets were evaluated by the following methods. The result is given in Table 1.

Comparative Examples 1 and 2

As the Comparative Examples, pellets were prepared by a similar procedure to that for Examples for each case of not using the fatty acid ester (Comparative Example 1) and of using higher acid value and hydroxyl value as the fatty acid ester, (B-3) (Pentaerythritol tetrastearate, LOXIOL VP861, manufactured by COGNIS JAPAN LTD.). These pellets were evaluated. The result is given in Table 1.

[Acid Value and Hydroxyl Value of Fatty Acid]
These values were evaluated in accordance with JIS K0070.

[Test of Flexural Properties]
The flexural strength, the flexural modulus, and the strain on flexural break were measured in accordance with ISO 178.

[Blister Test]
The test pieces for blister evaluation (124 mm in length, 12 mm in width, and 0.8 mm in thickness) were molded under the following condition.

Molding Condition
Molding machine: SE100DU-C250M (manufactured by Sumitomo Heavy Industries, Ltd.)
Cylinder temperature: 370° C.
Injection speed: 33 mm/sec
Holding pressure: 70 MPa
Injection pressure holding time: 9 sec
Cooling time: 10 sec
Screw rotational speed: 100 rpm
Screw backpressure: 4 MPa Each of the prepared test pieces was allowed to stand in an oven at an arbitrary temperature for 5 minutes. After that, the surface of the test pieces was observed. The highest temperature that did not cause blister on the surface was defined as the Blister Free Temperature (BFT). Higher BFT gives further excellent heat resistance.

[Mold-Releasing Resistance]
The hat-shaped molded article, shown in FIG. 1, was molded under the following condition. The peak pressure at the time of the ejection of the molded article was determined by using an indirect pressure sensor, which peak pressure was defined as the mold-releasing resistance.

Molding Condition
Molding machine: FANUC ROBOSHOT α-50C (manufactured by FANUC LTD.)
Cylinder temperature: 370° C.
Mold temperature: 80° C.
Injection speed: 50 mm/sec
Holding pressure: 50 MPa
Injection pressure holding time: 5 sec
Cooling time: 10 sec
Screw rotational speed: 100 rpm
Screw backpressure: 1 MPa
Ejection speed: 50 mm/sec

TABLE 1

|  | Unit | Example 1 | Example 2 | Comparative Example 1 | Comparative Example 2 |
| --- | --- | --- | --- | --- | --- |
| Liquid crystalline polyester resin | wt % | 54.7 | 54.7 | 55 | 54.7 |
| Glass fiber | wt % | 15 | 15 | 15 | 15 |
| Talc | wt % | 30 | 30 | 30 | 30 |
| Fatty acid ester B-1 | wt % | 0.3 |  |  |  |
| Fatty acid ester B-2 | wt % |  | 0.3 |  |  |
| Fatty acid ester B-3 | wt % |  |  |  | 0.3 |
| Acid value | — | 0.1 | 0.1 | — | 1.3 |
| Hydroxyl value | — | 2.5 | 2.5 | — | 11 |
| Flexural strength | Mpa | 135 | 141 | 165 | 140 |
| Flexural modulus | Gpa | 12.24 | 12.09 | 12.46 | 12.36 |
| Strain on flexural break | % | 1.3 | 1.4 | 1.7 | 1.4 |
| Mold-releasing resistance | N | 180 | 207 | 532 | 190 |
| BFT | ° C. | 270 | 280 | 280 | 250 |

The invention claimed is:
1. A melt-processable liquid crystalline polyester resin composition adapted to form upon injection molding a molded article which displays a combination of enhanced mold releasability and improved heat resistance as evidenced by the absence of surface blistering upon heating, comprising 100 parts by weight of a liquid crystalline polyester resin; and 0.001 to 1 part by weight of a fatty acid ester which is a tetraester of pentaerythritol with a C10 to C32 higher fatty acid and has an acid value ranging from 0.01 to 0.5 and a hydroxyl value ranging from 0.01 to 5.

2. The melt-processable liquid crystalline polyester resin composition according to claim 1, wherein the fatty acid ester is pentaerythritol tetrastearate or pentaerythritol tetrabehenate having the specified acid and hydroxyl values.

3. The melt-processable liquid crystalline polyester resin composition according to claim 1, wherein the acid value is 0.3 or smaller.

4. The melt-processable liquid crystalline polyester resin composition according to claim 1, wherein the hydroxyl value is 4 or smaller.

5. The melt-processable liquid crystalline polyester resin composition according to claim 1, wherein the hydroxyl value is 3 or smaller.

6. The melt-processable liquid crystalline polyester resin composition according to claim 1, wherein said fatty acid is pentaerythritol tetrastearate having the specified acid and hydroxyl values.

7. The melt-processable liquid crystalline polyester resin composition according to claim 1, wherein said fatty acid is pentaerythritol tetrabehenate having the specified acid and hydroxyl values.

8. The melt-processable liquid crystalline polyester resin composition according to claim 1, adapted to form an injection molded article which displays enhanced mold releasability combined with improved heat resistance as evidenced by the absence of blistering at a temperature of 270° C.

* * * * *